United States Patent [19]

Schumacher et al.

[11] 4,453,832
[45] Jun. 12, 1984

[54] APPARATUS FOR TROUBLE-FREE AND CONTINUOUS CHARGING OF EXTRACTORS WITH EXTRACTION FEEDSTOCK TO BE TREATED AND WITH EXTRACTANT OR SOLVENT

[76] Inventors: Heinz O. Schumacher, Höperfeld 26, D-2050 Hamburg 80; Heinz H. Thiem, Kleiner Sand 66, D-2082 Uetersen, both of Fed. Rep. of Germany

[21] Appl. No.: 314,777

[22] Filed: Oct. 26, 1981

[51] Int. Cl.³ .............................................. B01F 5/04
[52] U.S. Cl. ................................... 366/167; 366/174; 366/305; 366/312; 366/315; 366/337
[58] Field of Search ............................ 366/167–174, 366/305, 312, 315, 337; 141/1, 392, 285–310, 83

[56] References Cited

U.S. PATENT DOCUMENTS 2,273,835  2/1942  Cornell ........................... 366/315 X
2,833,630  5/1958  Loevenstein ...................... 366/167

Primary Examiner—Houston S. Bell, Jr.
Attorney, Agent, or Firm—Bachman and LaPointe

[57] ABSTRACT

The apparatus serves for the continuous mixing and suspending of material to be extracted, particularly seed material, such as soy material, with solvent or extractant, particularly hexane and other suitable hydrocarbons, provision being made for preventing the influence of atmospheric oxygen on the extraction material as well as the formation of solvent vapors throughout the entire plant.

The apparatus comprises a vessel having an upper cylindrical portion and a lower funnel-shaped portion, a centrically arranged inner tube having a flared portion within said vessel and a cylindrical enlarged portion above said vessel, a chute for the feeding in of extraction material opening into said enlarged portion, a disc-type agitator carried by a shaft, an inner screen, an inlet connection piece for extractant in the region of said screen, tangentially directed dislodging scrapers, overflow connection structure, pressure-equalizing connection structure, connection structure for removing air by suction and a suspendedly mounted driving system for the shaft of the disc agitator, which system serves at the same time as a weighing element.

9 Claims, 3 Drawing Figures

APPARATUS FOR TROUBLE-FREE AND CONTINUOUS CHARGING OF EXTRACTORS WITH EXTRACTION FEEDSTOCK TO BE TREATED AND WITH EXTRACTANT OR SOLVENT

BACKGROUND OF THE INVENTION

The present invention relates to apparatus for charging or filling extractors of the type in which particularly oilcontaining vegetable raw materials, such as oil seed and oil fruit, are treated with an organic solvent or extractant in a continuous process wherein the glyceride components (oils and fats) are transformed into the extracted liquid phase.

Practically the only substances used in the art as extractants or solvents for oil seeds, especially where edible oils and edible fats are to be produced, are benzene, hexane, heptane, octane or blends thereof having boiling ranges from 60° to 100° C.

Apparatus and equipment for continuously operating extraction processes are largely known and reference is made to the pertinent technical literature. According to the most recent developments such equipment either comprises vertically arranged extraction columns with or without agitating components or horizontally designed frame belt extractors, screw-type extractors, pot or cup-type extractors, plants including endless conveyor belts, bucket-conveyor type extractors, basket type extractors etc.

Practically all technically feasible processes operate by the countercurrent method. In accordance with this method, fresh extractant is used for the final rinsing of the material having already been extracted to a high degree. This final phase of extraction is frequently preceded by several steeping, washing and extracting steps until, finally, there is obtained a miscella containing about 15 to 35% oil and 65 to 85% solvent, depending on the type of extraction used.)

Subsequent to the extraction, the miscella, possibly after a blank filtering and clarification, is separated by distillation into oil and solvent. The distillation is at low temperatures with chiefly indirect steam heating and is easily accomplished in two or three stages due to the considerably different boiling points of the constituents of the mixture.

As is generally known, it is of decisive importance for the quality of a vegetable oil, such as soy oil, that the content of phosphatides (lecithin) is as low as possible. Such phosphatides as well as the fatty constituents of the oil exhibit considerable instability against autoxidation phenomena. This is, for example, the cause of oil becoming rancid. It has long been known that edible oils will keep only for a limited time. Due to this autoxidation phenomena, with formation of unsaturated aldehydes etc., a seedlike off-flavor develops, frequently after a few weeks only.

It has now been found as a result of detailed investigation that, independent of the type of extractant or of the operating conditions during extraction, such autoxidation reactions, involving also the phosphatides, start immediately whenever the extractant comes into contact with the comminuted seed material in the presence of atmospheric oxygen or whenever free, oxidizable surfaces are formed during the comminution of the seed material.

The autoxidation of the phosphatides is due to the coaction of oxygen and certain prooxygenic substances present in the seed material, particularly enzymes.

It has already been proposed to eliminate the influence of such enzymes by subjecting the seed material to heat treatment prior to extraction. Such heat treatment does have the effect of substantially destroying the enzymes (catalases) and reducing autoxidation. However, to achieve this, considerable expenditure in the way of process technology, apparatus and energy is required, out of all proportion to the possible success that may be obtained.

The specific enzymes causing the decomposition or autoxidation of the phosphatides (lecithin) can be inactivated also by sulfur compounds. Such sulfur compounds are present in considerable measure in the raw seed material. However, these sulfur compounds become inactive when, under the action of considerable heat, particularly in an air stream, also in the presence of highly volatile solvents (hexane), reaction products of the process, in the form of $H_2S$, COS, mercaptanes etc., are carried away too quickly.

Summarizing, technology so far has not been in a position to stop the autoxidation of the phosphatides (lecithin) because, on the one hand, the destruction of the enzymes is not justifiable economically and, on the other hand, the coaction of enzyme and oxygen responsible for autoxidation has not been eliminated. Moreover, the working with toxic, highly flammable, low-boiling extractants, such as benzene, hexane etc. presents considerable technical problems.

Therefore, it is necessary that, under operating conditions, the mixing of the extraction feedstock with the extractant (solvent) takes place in an entirely closed system excluding any influence of atmospheric oxygen as well as the occurrence of leakages.

Especially in the extraction of vegetable raw materials, but also in other extraction processes of industrial chemistry, the extraction proper in horizontal or vertical extractors generally is preceded by comminution of the raw material, whereby the material is brought into a finely divided form (flakes) facilitating extraction.

During the comminution (flaking) of oil seeds, for example, fresh, i.e. oxidizable surfaces are exposed, whereby considerable deterioration in quality is caused even before the extraction proper.

Therefore, provision must be made to exclude the influence of oxygen (air) already directly following the flaking. That means, it is necessary to ensure that the entire apparatus between the flaking device and the extractor, but especially the unit or installation for the mixing of comminuted material and extractant, forms a completely closed system permitting no access of air and no escape of solvent vapors into the atmosphere.

Further, it is well known to those skilled in the art that when flaked, i.e. comminuted raw material, meets with the extractant, overheating (spontaneous beginning of reaction or extraction) or agglomeration, agglutination etc. are apt to occur, depending on the characteristics of the material involved. These undesirable attendant phenomena, which cause considerable disturbance in the process, make it necessary to provide for an optimally adjusted mixing process of comminuted extraction feedstock and solvent.

For such mixing, generally, agitating vessels, feed screws and similar mixing apparatus are used and it is necessary to ensure proper proportioning and dosage.

It has been found that it is extremely difficult to achieve proper dosage with large quantities and in this case the problems as derived above can hardly be mastered. In case of the intermittent admixing of small quantities the abovementioned problems do not occur to the same extent, but such intermittent admixing of small quantities has a restrictive effect on the economical use of the installation capacity and therefore is not justifiable.

SUMMARY OF THE INVENTION

It is an object of the invention to provide a device or apparatus for trouble-free, continuous charging of extractors wherein the mixing of extraction feedstock and solvent proceeds without disturbance even with large flow rates. That means that undesirable agglomeration and overheating in the mixing phase will not occur, any influence of atmospheric oxygen will be absolutely excluded, any escape of solvent vapors will be prevented and continuous, uniform charging of the extractor will be achieved.

Thus, the subject matter of the invention is an apparatus for trouble-free, continuous charging of extractors with extraction feedstock and extractant. The apparatus comprises a closed vessel with a tubular member inserted through the upper cover portion of the vessel and ending in a widening portion. The vessel is substantially circular in shape and has an upper cylindrical portion and a funnel-shaped portion extending downwardly from said cylindrical portion. The transition from the cylindrical portion to the funnel-shaped portion is at about one half of the height of the vessel. The tubular member also terminates in that region, having its largest diameter at that point. Above the cover of the vessel the tubular member has a portion of enlarged diameter and extending into the latter is a laterally introduced chute through which the extraction feedstock is fed in. A connection piece provided in the upper enlarged-diameter portion of the tubular member serves for leading off any air introduced with the extraction feedstock. Centrically supported within the tubular member is a drive shaft which terminates in a rotary disc or plate and operates to rotate the latter. The rotary disc is also disposed approximately at the height of the transition from the cylindrical portion of the vessel to the lower funnel-shaped portion of the vessel. The vessel is provided with a number of pipe connections which permit, in connection with the rate of rotation of the agitator disc and with the quantity of extraction feedstock introduced, to control the filling of the vessel. The agitator shaft is supported at the upper end of the tubular member by a plurality of arms, said arms being in turn connected to a transmission gearing joined to the driving motor for the agitator shaft. The speed of the driving motor determines the quantity of extraction material present on the agitator disc. This quantity is continuously measured by an electric weighing cell, the result of such measurement determining the amount of extraction material entering through the lateral chute. The apparatus operates fully continuously and regulates the filling level of extraction material and extractant to maintain a constant filling level.

By the operation of the apparatus according to the invention, the extractor connected thereto, which may be of any design, is supplied with an absolutely homogeneous mixture free from oxidized constituents and consisting of raw material uniformly saturated with solvent.

Generally, the novel apparatus for continuous charging of extractors can also be integrally connected with the extractor so as to form a unit with the latter; all that is necessary therefor is to join the connection piece at the discharge outlet of the funnel-shaped portion of the vessel directly to the inlet of the extractor.

Of special technical importance with the novel charging apparatus for extractors according to the invention and decisive for optimal operation thereof are the absolute exclusion of atmospheric oxygen in the region where the extraction material and the extractant come together and the absolutely controllable mixing proportion of extraction material and extractant achieved by the structural design, particularly the shape of the vessel, the controllability of the velocity of agitation in conjunction with the feed of raw material, the controllability of the rate of circulation of the extractant and thereby, altogether, the control of the charge level in the vessel itself.

So far, such a system is not known from the prior art. Rather, with prior art systems, the mixing of the reactants is effected either in normal single-thread screws, as with British Pat. No. 1,147,709 and British Pat. No. 1,250,343, or in a system merely conveying the material or mixture, as with U.S. Pat. No. 2,582,675.

Only the design of the charging and equalizing vessel according to the invention with specific connection systems for solvent, solvent overflow and reflux, pressure equalization, air outlet etc. in particular positions of the vessel, with a specific agitator structure and arrangement has made it possible to provide a fully closed, continuously operating system.

BRIEF DESCRIPTION OF THE DRAWINGS

The novel apparatus for trouble-free and continuous charging of extractors with extraction feedstock to be treated and extractant will now be described in detail by reference to the accompanying drawings, FIGS. 1 to 3, wherein.

DETAILED DESCRIPTION

Figure 1:
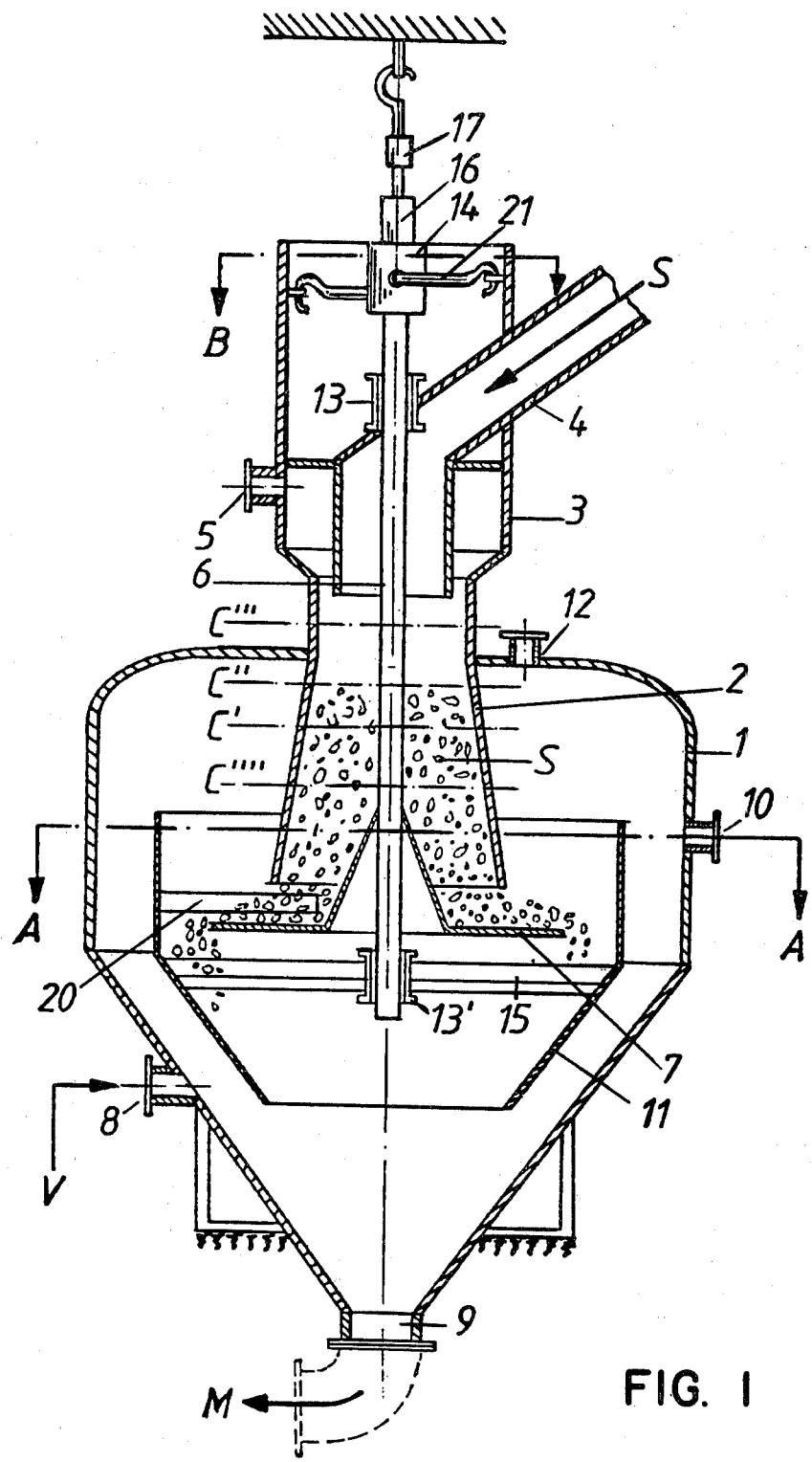
FIG. 1 shows the structure of the apparatus in elevation.
Figure 4:
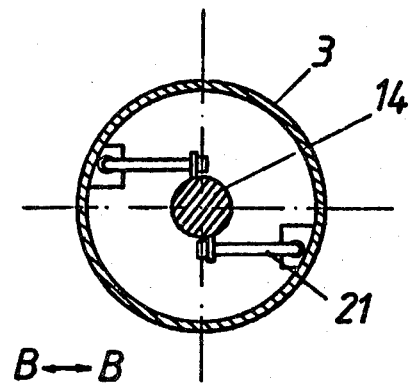
FIG. 4 shows a horizontal cross section taken along line B—B of FIG. 1.

According to FIG. 1, the novel apparatus for trouble-free and continuous charging of extractors comprises the vessel (1) proper, composed of an upper, substantially cylindrical portion and a lower, substantially funnel-shaped portion. The cylinder and the funnel each take up about one half of the height of the vessel. A tubular member extends through the cover of the upper cylindrical portion of the vessel (1) and below the cover said member widens, forming a flared portion (2). The tubular member terminates approximately in the lowermost third of the cylindrical portion of the vessel (1). Above the cover of the vessel, the tubular member is formed with an extension of enlarged diameter (3). So, in FIG. 1, the tubular member as a whole can be designated by (2, 3). A laterally entering chute (4) for the feeding in of extraction feedstock (S) opens into the enlarged extension (3) of the tubular member (2, 3). An agitator shaft (6) supported in radial bearings (13, 13') carries at its lower end a disc-type agitator (7). The latter moves below the lower end of the tubular member (2, 3) but above the dividing line between the cylindrical portion and the funnel-shaped portion of the vessel (1). The upper surface of the disc (7) and the end of the tubular member (2, 3) define a gap through which the extraction material falls into the lower portion of the vessel (1). Arranged concentrically with the agitator shaft (6) and at a distance is an inner screen (11) which extends downwardly into the funnel-shaped portion of the vessel (1). The function of that screen will be explained later. Secured on said screen are supporting arms or brackets (15) for the radial bearing (13') as well as dislodging scrapers (20). The latter serve to ensure that the material (S) disposed on the agitator disc (7) can fall downwardly without being impeded by the formation of lumps or congestion.

The functions of the various connection pieces according to FIG. 1 are as follows: connection piece (5) serves for the continuous removal by suction of any air introduced with the extraction material (S) through the chute (4). Connection piece (12) communicates with a pressure equalizing pipe (not shown) to which all apparatus of the entire plant, such as extractor, solvent/water separator, filter etc. are connected. Connection piece (9) serves for leading away the suspension of extraction material and extractant formed in the apparatus according to the invention. Generally, a pipe connected to the connection piece (9) conducts the suspension (M) via a suitable pump directly to the extractor, or the connection piece (9) is placed on a suitable feed screw (see FIG. 3) which in turn brings the suspension (M) into the extractor.

At (8), solvent or extraction material respectively, e.g. a miscella, enters the vessel (1). According to the features of the invention, the amount of extractant entering the vessel is greater than the amount withdrawn therefrom, together with extraction materials, in the form of a suspension at (9). Due to that, the level of the extractant or suspension in the vessel (1) increases. The difference out of extractant entering at (8) and extractant issuing from (9) flows out in a controlled manner, as explained hereinafter, through the connection piece (10) and is circulated (see FIG. 3) together with the extractant.

Decisive for the function or operation of the novel charging apparatus is the maintenance of the levels (C'-C") of the extraction material (S). If the extraction material in the tubular member reaches the level (C''') or (C''''), which are maximum and minimum filling conditions respectively, the feed of extraction material (S) or the rotational movement of the agitator shaft is reduced correspondingly, which may occasionally lead to complete, but only brief stoppage of the agitator or of the feed of material (S). The level of the extractant (V) in the vessel (1) is determined on principle by the line (A—A), being controlled by the overflow (10).

The control of the level of extraction material (S) over the range of (C')-(C'''') and the level of extractant (V) is, of course, effected electronically. It is unnecessary to make any detailed statements in this respect as such details do not form part of the invention.

The screen (11) concentrically surrounding the tubular member (2, 3) in the middle region of the vessel (1) has the function to prevent that the extractant entering at (8) will come into direct contact with the dry extraction material (S) in (2). Rather, the extractant (V) is first directed by the action of a suitable conveying or feeding means, e.g. a pump (33) (see FIG. 3) against the screen (11), whereby the extractant (V) is distributed.

The agitator shaft (6) is supported by two radial bearings (13, 13'). It is driven by motor means (6). The speed of rotation of the shaft (6) is controlled by a reduction gearing (14). The turning moment of the gearing or transmission (14) is tangentially buffered by the supporting arms (21) in flexible design so as to leave full axial freedom with respect to the weighing cell (17), said weighing cell itself continuously detecting the quantity of the weight of the extraction material on the rotary disc (7) and transmitting it to a control station, not shown.

Figure 2:
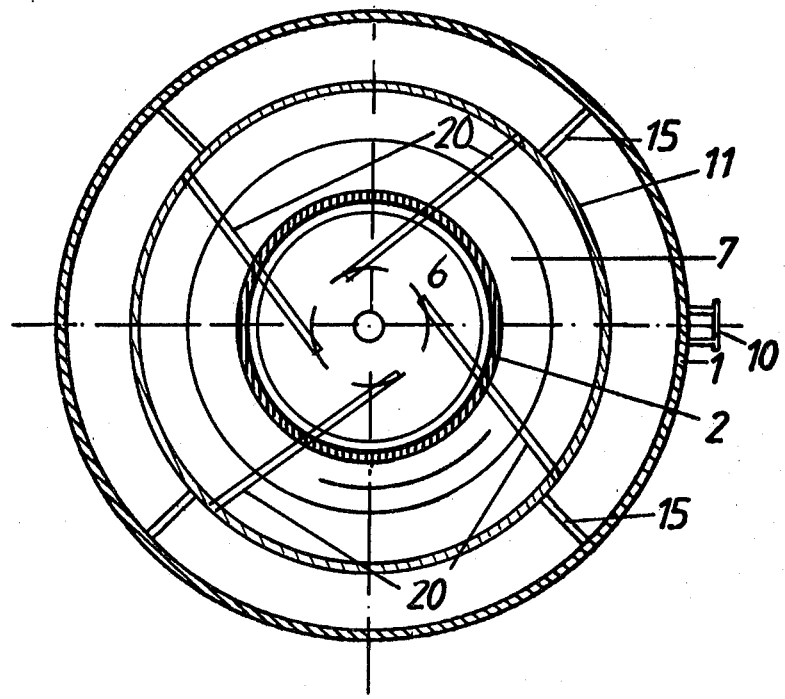
FIG. 2 shows a horizontal cross section taken along line A—A of FIG. 1

FIG. 2 shows in sectional view the construction of the novel charging apparatus, on the one hand in the area (B—B) according to FIG. 1 and on the other hand in the area (A—A) according to FIG. 1. As can be seen from the sectional view (A—A), the dislodging scrapers (20) are staggered so that the material falling off the disc (7) is conveyed in the direction of rotation of the disc (7) to the space or gap between the screen (11) and the outer boundary of the disc (7).

Figure 3:
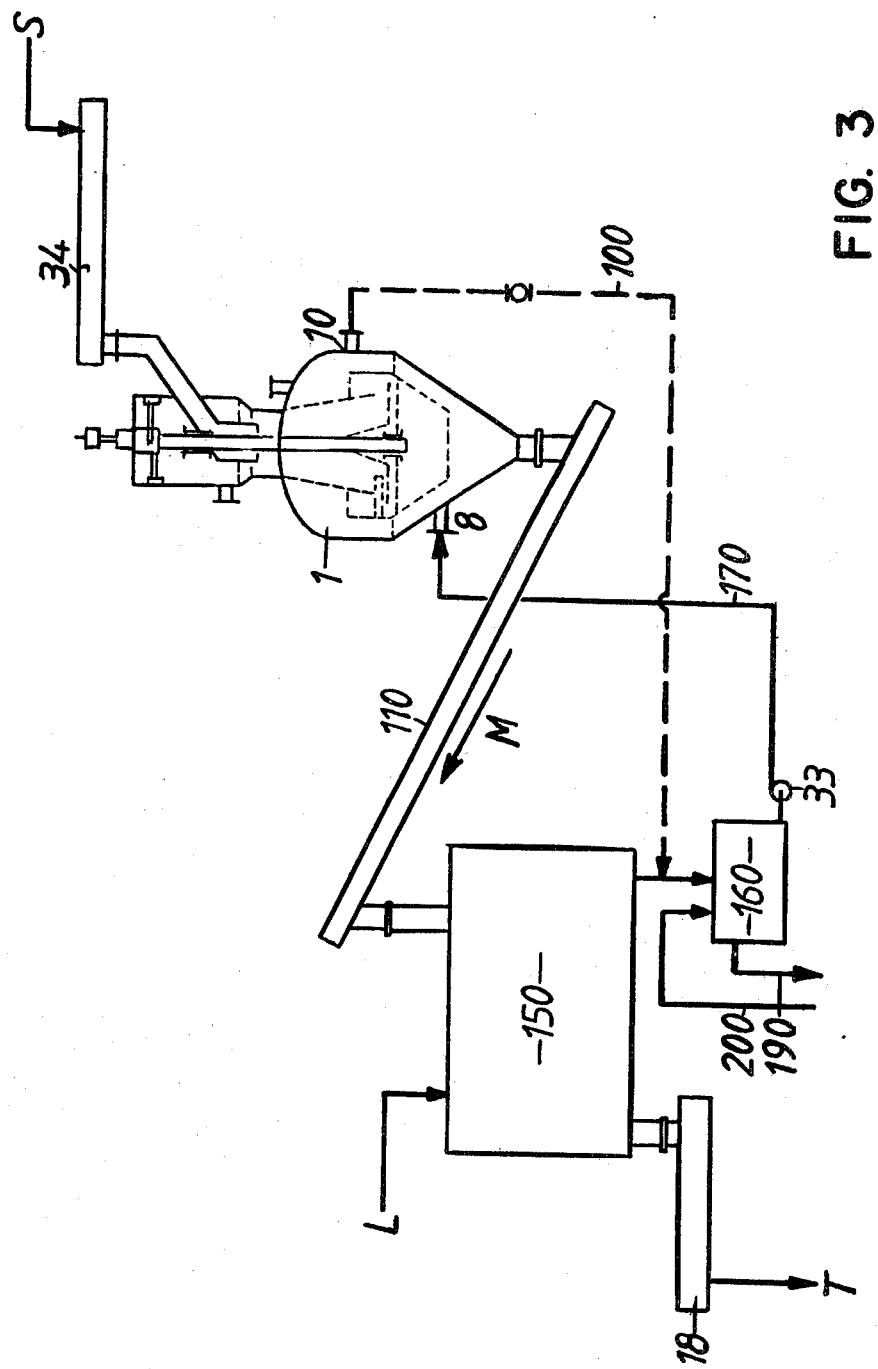
FIG. 3 illustrates the essential elements of an extraction plant incorporating the novel apparatus.

FIG. 3 shows schematically the setup of a plant for the extraction e.g. of seed material, particularly of soy material, with the aid of hexane, which is used as a preferred extractant in this field.

The soy flakes (S) produced according to known methods by suitable comminuting devices are conveyed by way of a suitable conveying system (34), such as a weighing roll, a screw operating at controlled speed etc., into the charging apparatus (1) which has been described in detail in the foregoing. The suspension (M) of soy flakes and hexane formed in (1) is continuously fed to the extractor (150) through a feed screw (110). The design of the extractor is not of importance for the apparatus described here. The novel charging apparatus is suitable for any known type of extractor.

The extractor (150) is supplied, through suitable feed means, with solvent (L), in the specific case with fresh hexane. The miscella formed is collected in the tank (160) and continuously returned, through a pump (33) and pipe (170), to the charging device (1). A suitable overflow system (200, 190) allows both, withdrawal of miscella from the circulation system and maintaining of a controlled level of miscella in the tank (160). The residue of extraction leaves the extractor by way of a suitable feed screw (18) and is passed on e.g. to a toaster (T).

The miscella flowing off through the connection (10) is conducted through pipe (100) to the tank (160) and thus remains in constant circulation.

It is understood that the pipes (100, 170) include all auxiliary components necessary, such as sight glasses, valves etc., which need not be shown here.

Extractor charging devices that have become known heretofore still have the drawback that, together with the extraction feedstock, atmospheric oxygen is carried into the extraction space to a considerable extract. This makes it necessary that the whole system is connected through venting units with extensive benzene recovery installations. With known extraction plants, the air introduced together with the extraction feedstock may become saturated with extractant, particularly hexane, up to 3 kg/m$^3$ exhaust air, depending on the temperature, and such extractant has to be recovered from the exhaust air for economical reasons as well as for safety means.

However, solvent recovery installations require not only high capital investments but also extensive maintenance work and highly complicated apparatus. The hazards to the environment caused by such installations are well known. Mill accidents due to the development of explosive mixtures of solvent vapor and air are no rare occurrences.

The measures of the present invention make such solvent recovery installations unnecessary. Thus, altogether, a considerable improvement in safety of extraction plants with solvents is achieved.

Finally, it may be recalled that disturbances in operation may result in considerable excess pressure in the extractor. Such pressure values are sufficiently high to cause solvent gases to be brought back through the pipe system and known charging apparatus into the seed preparation system where they are not infrequently the cause of explosions and fires.

By the measures of the invention solvent losses are absolutely prevented and, likewise, the exclusion of oxygen prevents any corrosion of apparatus.

We claim:

1. An apparatus for continuous charging of extractors with extraction feedstock and extractant while a suspension of the reactants is formed in an oxygen-free environment without the occurrence of solvent vapors comprising a vessel having an upper portion and a lower portion, said upper portion having a cover provided with an opening, a tubular member positioned within said opening in said cover, said tubular member having a first portion within said vessel and a second portion extending above said cover, inlet means communicating with said second portion of said tubular member for feeding extraction material to said tubular member, a shaft rotatably mounted within said tubular member, said shaft having a disc secured to the lower end thereof proximate to the lower end of said first portion of said tubular member, inlet means in said lower portion of said vessel for introducing extractant into said vessel and outlet means below the extractant inlet means for removing the suspension formed by said extraction and said extractant from said vessel wherein a screen is provided within said vessel and surrounds said disc, said screen being provided with a plurality of scrapers located above said disc.

2. An apparatus according to claim 1 wherein said vessel includes overflow means for maintaining the level of the suspension below said overflow means.

3. An apparatus according to claim 1 wherein said shaft is mounted on a plurality of radial bearings.

4. An apparatus according to claim 1 wherein said vessel includes pipe means for carrying off any air introduced into said vessel with said extraction material.

5. An apparatus according to claim 1 wherein motor means is provided for driving said shaft.

6. An apparatus according to claim 1 wherein said upper portion of said vessel is substantially cylindrical in shape.

7. An apparatus according to claim 1 wherein said lower portion of said vessel is funnel-like in shape.

8. An apparatus according to claim 1 wherein said first portion of said tubular member is flared.

9. An apparatus according to claim 1 wherein said inlet means communicating with said second portion of said tubular member comprises a chute the axis of which is positioned at an acute angle with respect to the axis of said tubular member.

* * * * *